United States Patent [19]

Kuroda et al.

[11] Patent Number: 4,989,168

[45] Date of Patent: Jan. 29, 1991

[54] MULTIPLYING UNIT IN A COMPUTER SYSTEM, CAPABLE OF POPULATION COUNTING

[75] Inventors: Koji Kuroda; Shoji Nakatani, both of Kawasaki, Japan

[73] Assignee: Fujitsu Limited, Kawasaki, Japan

[21] Appl. No.: 273,582

[22] Filed: Nov. 21, 1988

[30] Foreign Application Priority Data

Nov. 30, 1987 [JP] Japan ................... 62-302463
Jan. 20, 1988 [JP] Japan ................... 63-010091

[51] Int. Cl.⁵ .......................... G06F 7/00; G06F 7/52
[52] U.S. Cl. ............................ 364/715.09; 364/754
[58] Field of Search ............ 364/715.09, 754, 757-760

[56] References Cited

U.S. PATENT DOCUMENTS

| | | | |
|---|---|---|---|
| 3,814,924 | 6/1974 | Tate | 364/757 |
| 4,189,716 | 2/1980 | Krambeck | 364/715.09 X |
| 4,594,680 | 6/1986 | Schomburg et al. | 364/765 |
| 4,630,192 | 12/1986 | Wassal et al. | 364/715.09 X |
| 4,679,164 | 7/1987 | Rearick | 364/754 X |
| 4,825,401 | 4/1989 | Ikumi | 364/760 |

FOREIGN PATENT DOCUMENTS 57-69451  4/1982  Japan ................... 364/754
62-209621  9/1987  Japan .

Primary Examiner—Gary V. Harkcom
Assistant Examiner—Tan V. Mai
Attorney, Agent, or Firm—Staas & Halsey

[57] ABSTRACT

Population counting is performed by using a multiplying unit, in the computer system, including a plurality of multiplying sub-units for simultaneously executing partial multiplication among elements obtained by dividing a multiplicand data and a multiplier data in a regular multiplication mode. In a population counting mode, an input data for the population counting is divided into population counting elements instead of the multiplier data and population counting on the population counting elements are performed simultaneously using the multiplying sub-units which produce partial counted data of the population counting elements, and the partial counted data is sent to a carry save adder and a carry propagate adder by which a population counting result for the input data is obtained and output.

11 Claims, 10 Drawing Sheets

FIG. I
PRIOR ART
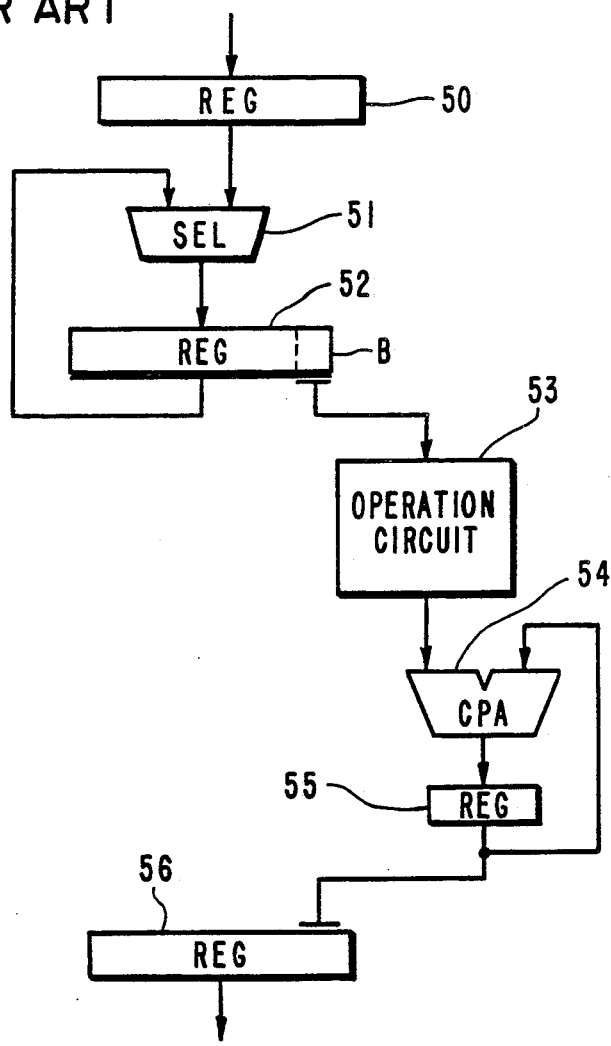
FIG. 2
PRIOR ART
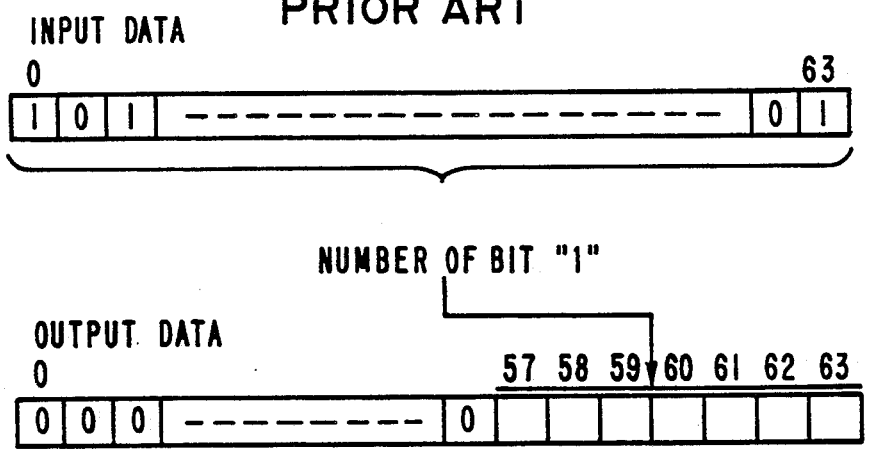

TO REG 11 THROUGH POST SFT 10

MULTIPLYING UNIT IN A COMPUTER SYSTEM, CAPABLE OF POPULATION COUNTING

BACKGROUND OF THE INVENTION a. Field of the Invention

The present invention relates to a multiplying unit in a computer system and particularly to a multiplying unit capable of executing a population counting instruction.

b. Description of the Related Art

Due to the development of computer systems, data processing can be executed in the computer system at high speed. Therefore, in the field of a graphic display for example, the variable density of a graph can be processed rapidly by the computer system. That is, the variable density is processed at high speed in the computer system by counting the number of "1" bits of numerical data, represented by binary notation, including graphic information. Such counting of the number of "1" bits is called "population counting" and its invoking instruction is called a "population counting instruction". The present invention relates to population counting executed in a computer system.

Population counting has previously been performed by a circuit exclusively provided in the computer system. By such a dedicated population counting circuit, the number of "1" bits in the numerical data, usually consisting of 8 bytes, can be counted. However, the counting is performed byte by byte, so that it takes a lot of time to count up the "1" throughout the numerical data. If the only consideration was the increase of the counting speed, then counting could be performed by the dedicated circuit, every two bytes or more instead of every byte. However, this is not practically realized because, a large quantity of hardware (electric parts) is needed for the dedicated circuit. Thus, the use of the dedicated circuit has a problem that not only the cost for the circuit but also the time to perform the population counting increases. The present invention intends to solve this problem by using a multiplying unit provided in the computer system.

In the computer system, particularly in the recent high speed computer systems such as a super computer, a multiplying unit performs multiplication at high speed, on more than two bytes, using a carry save adder (CSA) and a carry propagate adder (CPA) which are well known adders used in the multiplying unit of the computer system. Accordingly, if the multiplying unit is allowed to be used to perform the population counting, the counting speed of the population counting can be increased without providing the dedicated population counting circuit. Furthermore, in the computer system, the multiplying unit is generally not used so often and also the population counting is not performed so often. Accordingly, it can be said that the use of the multiplying unit for population counting contributes so that the effectiveness of the usage of the multiplying unit increases rather than disturbing the operation of the computer system.

The use of the multiplying unit has been tried by Shoji Nakatani, who is one of the inventors of the present invention, in a laid-open Japanese Patent Application SHOH 62-209621 on Sept. 14, 1987. However, according to the SHOH 62-209621, there is another problem that the multiplying unit includes only one multiplying circuit with a spill adder. Therefore, when a multiplier of a multiplying data is divided into a plurality of elements, the multiplication must be repeated in the multiplying circuit by the number of the elements. For example, when the multiplier consists of 8 bytes and the multiplier is divided into 4 elements, the multiplication must be repeated four times; in this case, a multiplicand of the multiplying data is not divided. Furthermore, the spill adder is needed for compensating lower digits which appear during the repetition of the multiplication, so as to be carried up to the final multiplying results.

Generally, the multiplying unit has two types, a first type and a second type. The first type multiplying unit is one in which size is considered more important than counting speed, so that the first type multiplying unit usually includes only one multiplying circuit. The multiplying unit disclosed in SHOH 62-209621 is of the first type. While, the second type multiplying unit is one in which counting speed is considered more important than size, so that the second type multiplying unit includes a plurality of multiplying circuits (sub-units) operating in parallel. Accordingly, there has been a problem that the SHOH 62-209621 cannot be applied to the second type multiplying unit. The present invention intends to solve this problem.

SUMMARY OF THE INVENTION

An object of the present invention, therefore, is to increase the executing speed of the population counting instruction given to a computer system including the second type multiplying sub-units.

Another object of the present invention is to decrease a quantity of electrical parts for executing the population counting instruction in the computer system.

Still another object of the present invention is to perform the population counting, spending less fabricating costs on the computer system.

The above objects are accomplished by using the second type multiplying unit including a plurality of multiplying sub-units, particularly using the CSAs and the CPAs provided in each multiplying sub-unit, only adding a small amount of hardware (electrical parts) such as an adder, selectors and a few logical circuit elements to each multiplying sub-unit.

The multiplication performed in the multiplying unit is usually for executing programs in the computer system. This operating state will be called a "regular multiplication mode" hereinafter. However, according to the present invention, the computer system is modified so that the multiplying unit operates for both the regular multiplication and the population counting. In this case, the operating state of the multiplying unit will be called a "population counting mode" hereinafter.

In the population counting mode, a numerical data for the population counting is set to a multiplier register in the second type multiplying unit and divided into a plurality of elements. The division is performed based on the process of the regular multiplication mode; that is, the division is performed in consideration of a calculating form executed in the regular multiplication mode and the number of the multiplying sub-units of the second type multiplying unit. Wherein, the calculating form is a form for multiplying multiplicand and multiplier given to the multiplying unit. Generally, in the second type multiplying unit, there are several calculating forms. For example, according to some calculating forms, the multiplication is performed by multiplying the elements obtained by dividing the multiplicand and the multiplier with each other, and according to another calculating form, the multiplication is performed by multiplying the multiplicand, which is not divided, and the elements obtained by dividing the multiplier.

After the numerical data for the population counting is divided into a plurality of elements in the multiplier register, the bytes of each element are sent to the multiplying sub-unit respectively, and the number of "1" bits in each element is counted by a CSA newly provided to respective multiplying sub-unit for performing the population counting, and a half sum output (HS) and a half carry output (HC) concerning to the number of "1" bits in each element are produced from the newly provided CSA. These HS and HC are sent to a CSA and a CPA which have been provided to each multiplying sub-unit and added thereby, using their well known Booth's algorithm.

The count results of the numbers of the "1" bits in respective elements are sent from the multiplying sub-units to a common CSA and a common CPA which also have been provided in the second type multiplying unit, wherein the counted results from the multiplying sub-units are added and the final results of the population counting output from the common CPA.

As mentioned above, according to the present invention, since the hardware and the multiplying algorithm of the multiplying sub-units in the second type multiplying unit can be used effectively in parallel, the population counting can be performed at high speed, using less hardware.

BRIEF DESCRIPTION OF THE DRAWINGS

FIG. 1 is a block diagram of the population counting circuit of the prior art provided to the computer system;

FIG. 2 is an input and output data of 8 bytes of the population counting instruction;

DESCRIPTION OF THE PREFERRED EMBODIMENTS

Before describing the embodiments, the prior art dedicated population counting circuit and the first type multiplying unit capable of performing population counting as prior art will be briefly explained with reference to FIGS. 1 to 3, for the sake of understanding the present invention.

FIG. 1 is a block diagram of the dedicated population counting circuit of the prior art provided in a computer system. In the dedicated population counting circuit, population counting is performed as follows: numerical data, consisting of 8 bytes of binary notation, for population counting is given to a register (REG) 50; the 8-byte data is transferred to a REG 52 through a selector (SEL) 51, and a byte at the lowest unit of the 8-byte data in the REG 52, which will be called the lowest byte in the REG 52 hereinafter, is sent to an operation circuit 53 in which the number of "1" bits is counted and converted to a binary numeral and sent to a carry propagate adder (CPA) 54; in the CPA 54, the number of "1" bits in the lowest byte in the REG 52 is counted and stocked in an intermediate REG 55; during the above step, the 8-byte data in the REG 52 is shifted to right so that the next byte looking from the lowest byte treated in the above step is set at the lowest byte position; then the number of "1" bits in the next lowest byte is counted by the same process as above and the counted result for the next byte is added to the counted result to the previous lowest byte; in the CPA 54, the count of the number of "1" bits in respective byte is repeated every byte and these counted results are added; and the output from the CPA 54 is sent to a result REG 56 from which the number of "1" bits in 8-byte data is output as shown in FIG. 2. Thus, in the prior art dedicated population counter circuit, the count of "1" bits has been performed by repeating the counting of the "1" number bits in one byte eight times, which results in wasting a lot of time. This counting could be performed every two or more bytes, however it is impossible to realize this from a view point of the costs for the hardware.

Figure 3:
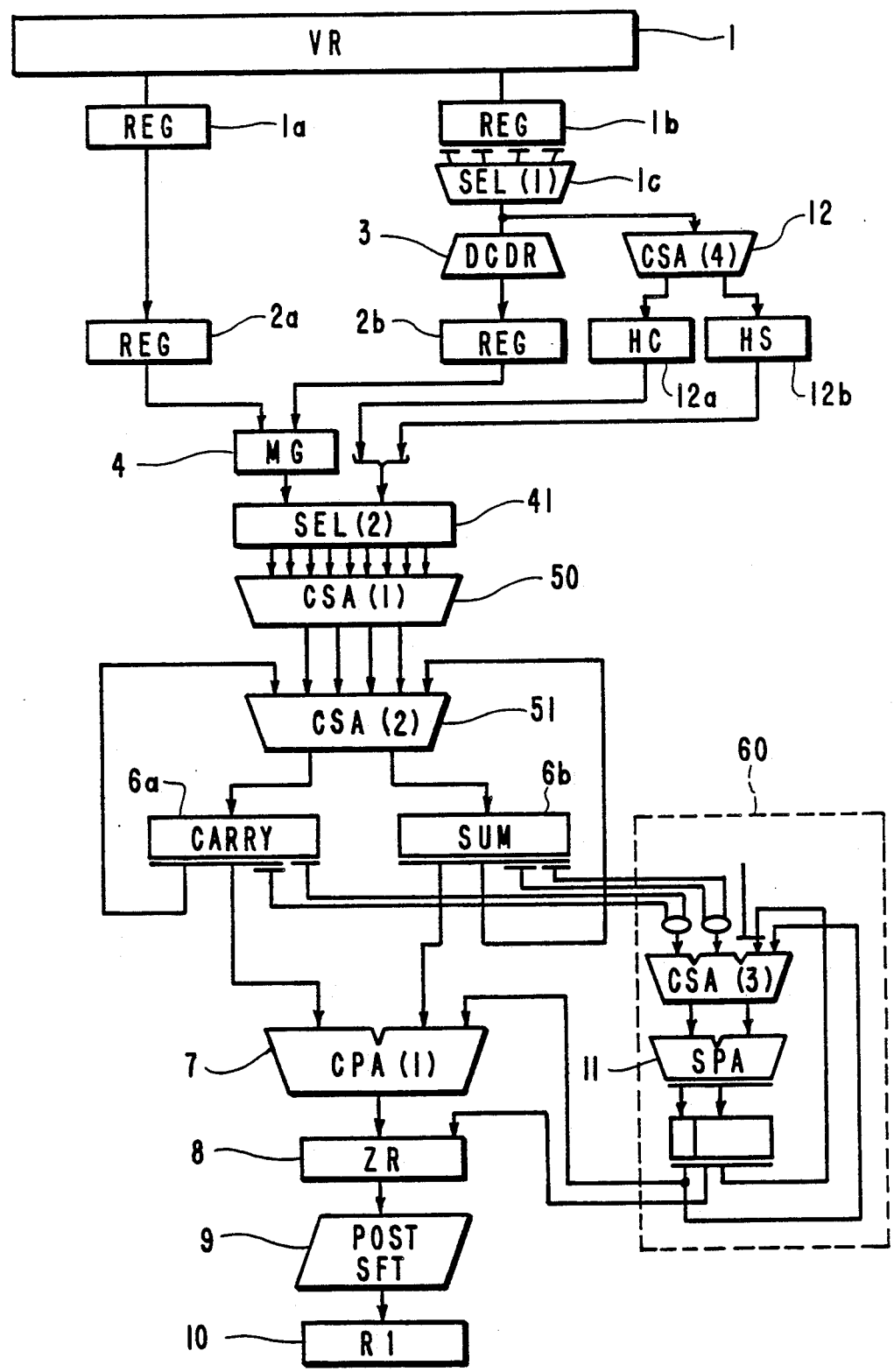
FIG. 3 is a circuit diagram of the population counting circuit of the prior art.

To solve the above problem of the dedicated population counting circuit, the usage of the multiplying unit for population counting has been tried as shown in FIG. 3. However, in this trial, the multiplying unit is of the first type multiplying unit including only one multiplying circuit with a spill adder, consequently, there remains a problem of counting speed as stated below.

When the first type multiplying unit shown in FIG. 3 operates in the regular multiplication mode, the first type multiplying unit operates as follows: a multiplying numerical data including the multiplicand and the multiplier, each consisting of 8 bytes of binary notation for example, is set in a vector REG (VR) 1; the multiplicand in the VR 1 is transferred to a multiplicand REG (CAND REG) 2a through a REG 1a; the multiplier in the VR 1 is set to a REG 1b and divided into four elements each consisting of 2 bytes (16 bits); each element of 2 bytes is sent to a decoder (DCDR) 3 in which the element is decoded into nine kinds of shift control signals, based on well known Booth's algorithm, wherein the nine kinds of shift control signals will be called "decoded signals" hereinafter; the decoded signals from the DCDR 3 are set or stored to a multiplier REG 2b as the multiplier to the multiplicand set in the CAND REG 2a; the multiplicand in the CAND REG 2a and the decoded signals in the multiplier REG 2b are sent to a multiple generator (MG) 4 in which the multiplicand is shifted as much as the numerals designated by the decoded signals, this generation in the MG 4 is called multiple generation; the shifted multiplicands produced from the MG 4 are sent to a first CSA (CSA(1)) 50 and a second CSA (CSA(2)) 51 in which the shifted multiplicands are added, producing the intermediate sum and the intermediate carry of the products of the multiplicand and the element of the multiplier at REGs 6a and 6b respectively; the above process is repeated four times for obtaining the products of the multiplicand and the four elements; the output for the REGs 6a and 6b are sent to a first CPA (CPA(1)) 7 in which the four results concerning to four elements are added, producing the total number of the "1" bits ; and the total number, namely a multiplication result, is set to a result REG (ZR) 8.

When the regular multiplication mode is changed to the population counting mode in the first type multiplying unit shown in FIG. 3, the first type multiplying unit performs the population counting as follows: the numerical data, consisting of 8 bytes of binary notation, for the population counting is set to the VR 1; the numerical data for the population counting is transferred to the REG 1b and divided into four elements each consisting of 2 bytes; each 2-byte element is selected from the lowest element by a first selector (SEL(1)) 1c, provided in the first type multiplying unit, so that the lowest element is sent to a fourth CSA (CSA(4)) 12, provided in the first type multiplying unit, in which the number of "1" bits in each element is counted, producing a half sum (HS) of "1" bits in the element and a half carry (HC) produced during the process of the HS, at a HS REG 12b and a HC REG 12a respectively; the HS and HC respectively stored in the HS REG 12b and the HC REG 12a are sent to a second selector (SEL(2)) 41, newly provided in the first type multiplying unit, in which the HS and HC are selected so as to be sent to the CSA(1) 50 and CSA(2) 51, suppressing the output of the MG 4 so as not to be sent to the CSA(1) 50; then the numbers of "1" bits in 4 elements are added, using the hardware and the Booth's algorithm of the CSA(1) and the CSA(2) repeatedly four times and also using a spill adder (SPA) 11 for compensating raised carry in the low units omitted during the operation of the CSA(1) 50 and CSA(2) 51; and the result of population counting of the given numeral data is output at the ZR 8.

As stated above, when the first type multiplying unit is used for performing population counting, the CSA(1) and CSA(2) are used, repeating as many times as the number of divided elements, which results in wasting a significant amount of time in order to count up all "1" bits of the numerical data. This wasted time is substantially reduced so as to be short by using the second type multiplying unit which includes a plurality of multiplying sub-units; that is, the population counting can be performed in a short time by using these sub-units.

Embodying the present invention, two kinds of the second type multiplying units each including four multiplying sub-units will be described for explaining a first embodiment and a second embodiment, referring to FIGS. 4 to 9 and FIGS. 10 to 12, respectively. In each embodiment, the multiplicand and the multiplier consist of 8 bytes, respectively.

In the first embodiment, the second type multiplying unit operates, in the regular multiplication mode, under a calculating form where the multiplicand and the multiplier are divided into two elements, respectively, so that each element consists of 4 bytes. The multiplicand is divided into an upper multiplicand element (CU) and a lower multiplicand element (CL) and the multiplier is divided into an upper multiplier element (IU) and a lower multiplier element (IL). Then regular multiplication is performed by multiplying the elements CU×IL, CL×IL, CU×IU and CL×IU, using the four multiplying sub-units respectively, and the multiplied results from the multiplying sub-units are added by a second CSA (CSA(2')) and a second CPA (CPA(2')).

Figure 4:
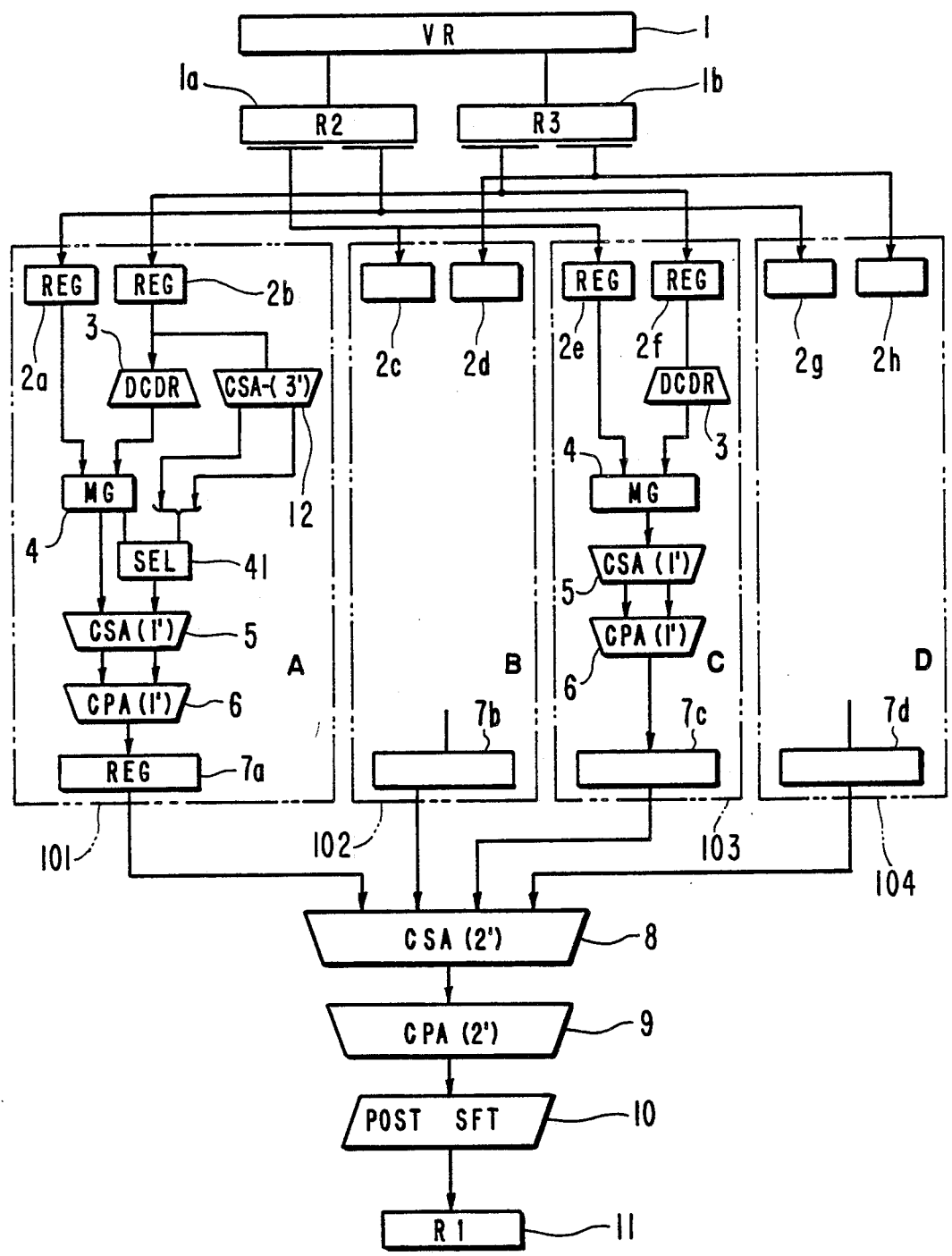
FIG. 4 is a block diagram of the first embodiment of the present invention.

FIG. 4 shows a block diagram of the second multiplying unit used as the first embodiment. In FIG. 4, the same reference symbol or numeral as in FIG. 3 designates the same function or part as in FIG. 3. In FIG. 4, when the second type multiplying unit operates in the regular multiplication mode, the multiplication of CL×IU, CU×IL, CU×IU and CL×IL is performed by a multiplying sub-unit A 101, which is called "sub-unit A" hereinafter, sub-unit B 102, sub-unit C 103 and sub-unit D 104 respectively. In the population counting mode, however, the sub-units A and B operate in the population counting mode and sub-units C and D operate in the regular multiplication mode. Therefore, only the block diagram of a multiplying circuit for the sub-unit A and C is shown in FIG. 4, leaving other sub-units B and D in blank except for the registers at the input and the output of the sub-units.

Regular multiplication is performed as follows: the numerical data for performing the multiplication is set or stored in VR 1; from the VR 1, the 8-byte multiplicand and the 8-byte multiplier are sent to the multiplicand REG 1a and the multiplier REG 1b, respectively; the multiplicand in the REG 1a is divided into the CU data and the CL data and the multiplier in the REG 1b is divided into the IU data and the IL data so that each element consists of 4 bytes; the CL data in the REG 1a and the IU data in the REG 1b are set to a REG 2a and a REG 2b in the sub-unit A, respectively; in the sub-unit A, the IU data set in the REG 2b is sent to a decoder (DCDR) 3 in which the decoded signals obtained from the IU data are produced and sent to a multiplier generator (MG) 4; while, the CL data set in the REG 2a is also sent to the MG 4 in which the multiple generation is performed with the CL data and the decoded signals as to the IU data; the output data from the MG 4 is sent to a first CSA (CSA(1')) 5 and a first CPA (CPA(1')) 6, in which the output data from the MG 4 is added in accordance with the Booth's algorithm, producing the partial product CL×IU at a result REG 7a; in sub-units B, C and D, the same operation as done in sub-unit A is performed respectively, producing the partial products CU×IL, CU×IU and CL×IL, respectively; these partial products are sent to a second CSA (CSA(2')) 8 and a second CPA (CPA(2')) 9 where the final result of the regular multiplication is obtained; and the final result is output to a result REG 11 through a post shifter 10 for normalization. Thus, in the second multiplying unit, the regular multiplication can be performed by making the four sub-units operate at the same time which results in shortening the operation time, compared with the operating time wasted in the first type multiplying unit.

When population counting is performed by the second type multiplying unit shown in FIG. 4, the mode of the second type multiplying unit is changed to the population counting mode. In this mode the numerical data of 8 bytes for the population counting, which will be called the "input 8-byte data" hereinafter, is given to the VR 1, and the input 8-byte data is set to the REG 1b in which the input 8-byte data is equally divided into two elements called an IU data and an IL data, each consisting of 4 bytes. The IU data is set to REGs 2b and 2f in sub-units A and C respectively, and the IL data is set to the REGs 2d and 2h in sub-units B and D respectively. In sub-unit A, the IU data is sent to a third CSA (CSA(3')) 12 composed of sixteen half adders 12-0, 12-1, ---, 12-14 and 12-15, by which sixteen HC signals HC00, HC01, HC02, ---, HC14 and HC15 and sixteen HS signals HS00, HS01, HS02, ---, HS14 and HS15 are produced and sent to a selector 41 composed of a first selector (SEL(1)) 41a and a second selector (SEL(2)) 41b, as shown in FIG. 4 and in FIG. 5 in detail. The selected data from the selector 41 is sent to the CSA(1') 5 having seventeen inputs and six steps of addition circuits. The output from the CSA(1') 5 is sent to the CPA(1') 6 in which a carry and a sum output from the CSA (1') 5 are added. The, results of the addition obtained by the CPA(1') are stored in the REG 7a.

The REG 2a has a function of outputting multiplicand bit signals and inverted signals of the multiplicand bit signals in the regular multiplication mode. The output signals from the REG 2a are shown in FIG. 5, and in the output signals from the REG 2a, the plus signal such as +R2-31 indicates the regular bit signal at the 31st bit position of the REG 2a and the minus signal such as −R2-31 indicates the inverted signal to the bit signal +R2-31.

Figure 5:
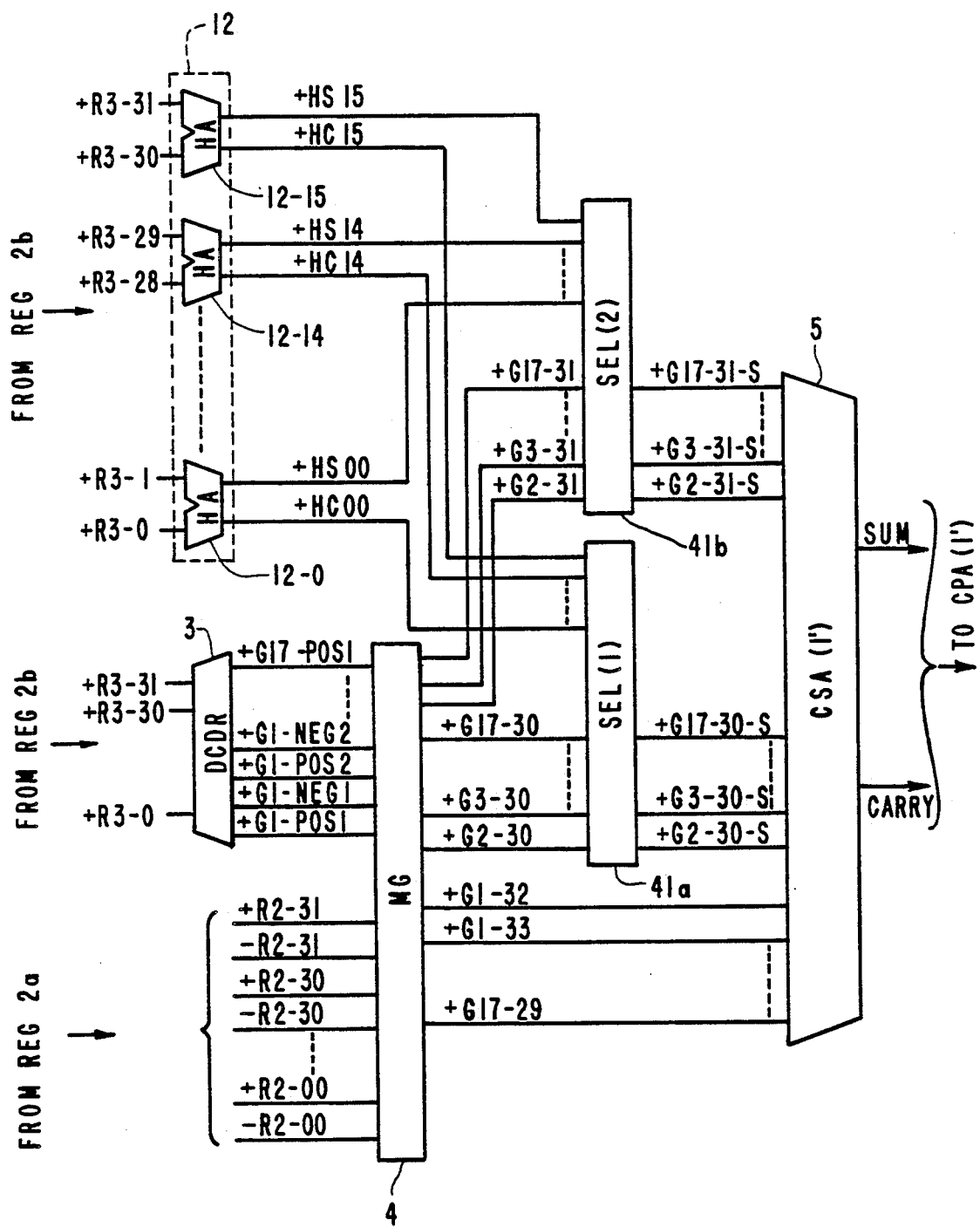
FIG. 5 is a circuit diagram illustrating the population counting mode in the first embodiment.

FIG. 5 is a circuit diagram showing the circuit connections among the CSA(3') 12, the SEL(1) 41a, the SEL(2) 41b, the DCDR 3, the MG 4 and the CSA(1') 5. In FIG. 5, the same reference symbol or number as in FIG. 4 designates the same unit or part as in FIG. 4. The REG 2b, which is not depicted in FIG. 5, has 32 bit-positions for setting the 4-byte IU data, and the bit-signals set in the 32 bit-positions are indicated by +R3-0, +R3-1, +R3-2, ---, +R3-30 and +R3-31. In the population counting mode, the bit-signals +R3-0 to +R3-31 set in the REG 2b are sent to the CSA(3') 12 including sixteen half adders (HAs) 12-0, 12-1, 12-2, ---, 12-14 and 12-15. Two bit-signals set in bit-positions (of the REG 2b) adjacent each other are sent to one of the sixteen HAs for performing the half addition of the two bit-signals. For example, the bit signals +R3-0 and +R3-1 set in the bit position 0 and 1, adjacent each other, in the REG 2b are sent to the HA 12-0 in the CSA(3') 12. In each HA, a half sum (HS) signal and a half carry (HC) signal are produced, so that 16 pairs of the HS and HC signals are output from the CSA(3') 12 and sent to the SEL(2) 41b and the SEL(1) 41a, respectively. For example, the signals +HS00 and +HC00 are output from the HA 12-0 and sent to the SEL(2) 41b and the SEL(1) 41a, respectively, as shown in FIG. 5.

Figure 6:
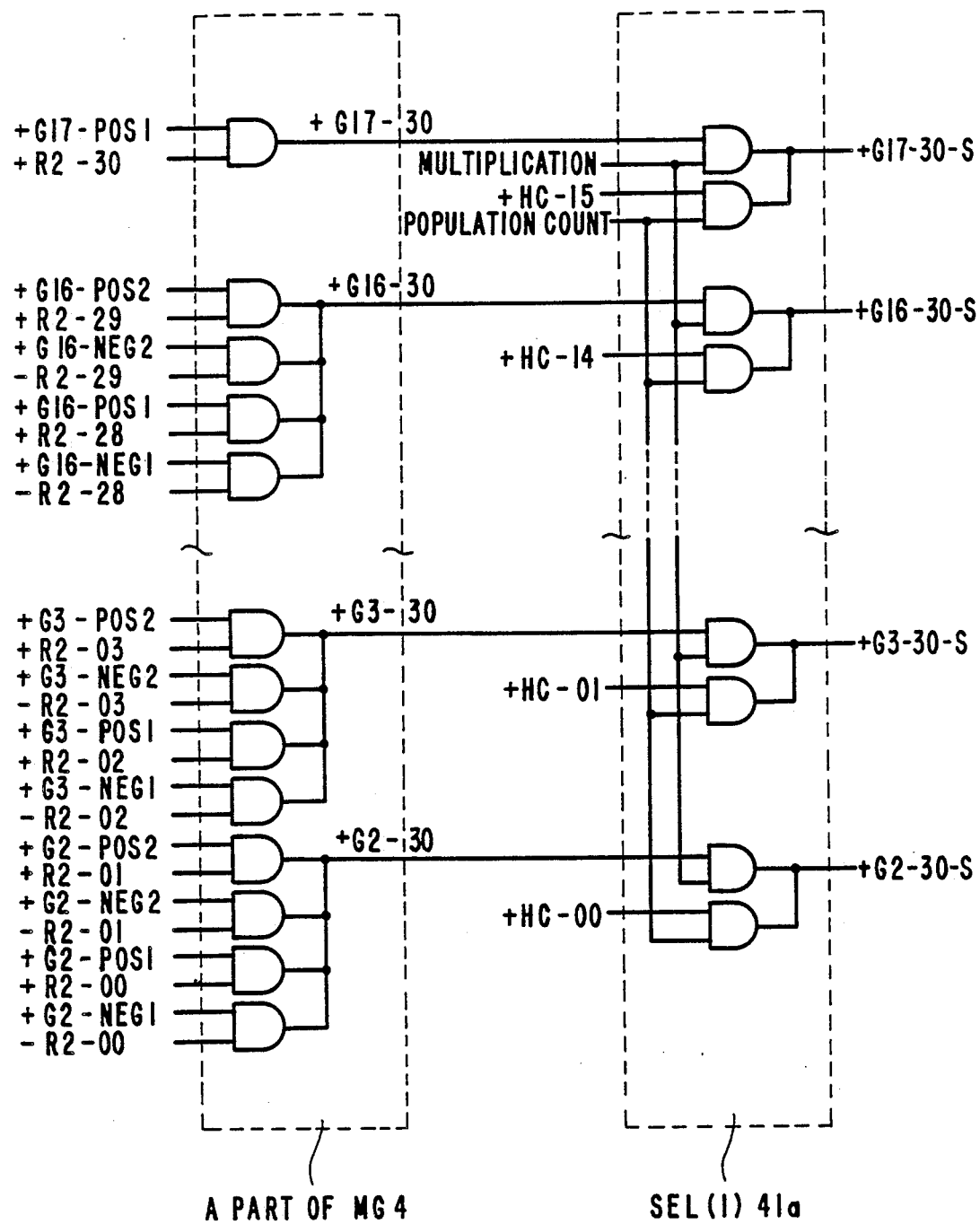
FIG. 6 is a circuit diagram of the first selector and a part of the multiple generator.
Figure 7:
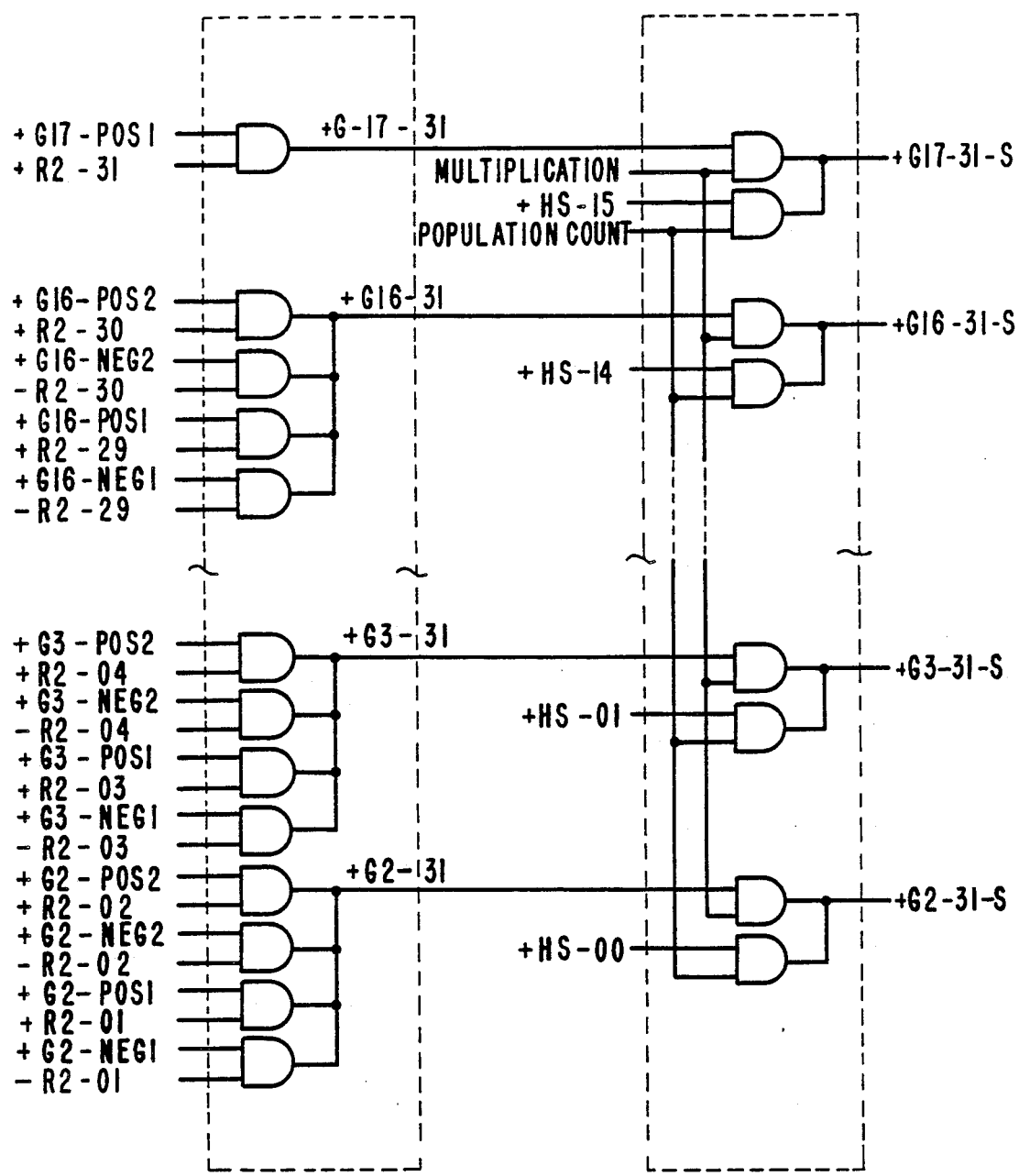
FIG. 7 is a circuit diagram of the second selector and a part of the multiple generator.

All 65 decoded signals +GI-POS1, +G1-NEG1, +G1-POS2, +G1-NEG2, ---, +G16-POS2, +G16-NEG2 and +G17-POS1 output from the DCDR 3 are set to "0", in the population counting mode. Accordingly, in the population counting mode, the input signals to the MG 4 are all set to "0", so that the output signals from the MG 4 also become "0" as seen from FIGS. 6 and 7. FIG. 7 is a block diagram illustrating the wiring connection between the MG 4 and the SEL (2) 41b. In FIG. 7, the same reference symbol or number as in FIGS. 5 or 6 designates the same unit or signal as in FIGS. 5 or 6. As shown in FIGS. 6 and 7, the output signals +G2-30, +G3-30, ----, +G16-30 and +G17-30 from the MG 4 are sent to the SEL(1) 41a, the output signals +G2-31, +G3-31, ---, +G16-31 and +G17-31 from the MG 4 are sent to the SEL(2) 41b, and the other output signals from the MG 4 are directly sent to the CSA(1') 5, wherein, the numbers 30 and 31 indicate the bit positions, which will be explained later in reference to FIG. 8, in the CSA(1') 5. The output signals, each having the number 30, from the MG 4 are suppressed by AND circuits in the SEL(1) 41a in the population counting mode, so that only the output signals +HC-00, +HC-01, ----, +HC-14 and +HC-15 from the CSA(3') 12 are output from the SEL(1) 41a as the input signals +G2-30-S, +G3-30-S, -----, +G16-30-S and +G17-30-S to the CSA(1') 5. In the same way, the output signals, each having the number 31, from the MG 4 are suppressed by AND circuits in the SEL(2) 41b in the population counting mode, so that only the output signals +HS-00, +HS01, ----, +HS14 and +HS-15 from the CSA(3') 12 are output from the SEL(2) 41b as the input signals +G2-31-S, +G3-31-S, ----, +G16-31-S and +G17-31-S to the CSA(1') 5.

Meanwhile, in the regular multiplication mode, the output signals from the CSA(3') 12 are suppressed at the SEL(1) and the SEL(2), and the output signals from the MG 4 are sent to the CSA(1') 5 directly and through the SEL(1) 41a and the SEL(2) 41b as seen from FIGS. 5, 6 and 7.

Figure 8:
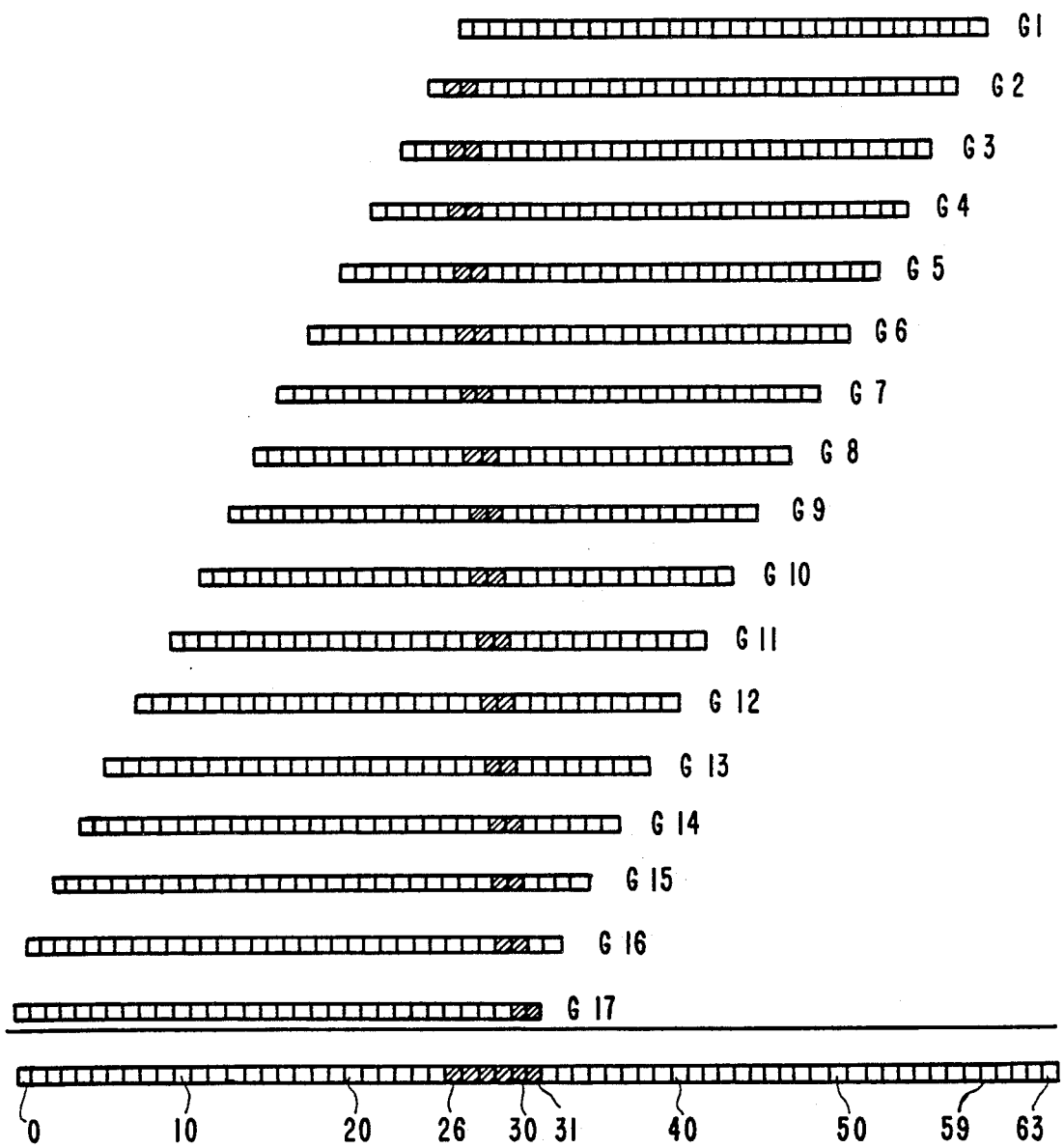
FIG. 8 is a schematic chart illustrating a method of addition in the sub-unit for population counting.

Again in the population counting mode, the signals concerning the HS and HC signals of the IU data are input to the CSA(1') 5 in which the input signals each having the number 30, for example +G2-30-S, and the number 31, for example +G2-31-S, are set at a definite bit position of sixteen bit rows described in FIG. 8.

FIG. 8 is a chart showing schematically a way of using addition to obtain the multiplication in the CSA(1'). The chart corresponds a partial product of 4 byte×4 byte performed in the regular multiplication mode. A total of 32 bits is set in each row, which will be called a "bit row" hereinafter, in the regular multiplication mode; however, in the population counting mode, a "0" is imposed at all positions except the hatched positions because all the input signals to the CSA(1') 5 from the MG 4 are set to "0" in the population counting mode as stated before.

For example, the input carry signal +G2-30-s to the CSA(1') 5 is set in the bit row G2 at a bit position corresponding to the 30th bit-position in a 64-bit carry numeral line depicted at the bottom in FIG. 8; the input sum signal +G2-31-s to the CSA(1') 5, related to the carry signal +G2-30-s, is set in the bit row G2 at a bit position corresponding to the 31st bit position in the 64-bit numeral line; the input carry signal +G3-30-s to the CSA(1') 5 is set in the bit row G3 at a bit position corresponding to the 30th position in the 64-bit numeral line; the input sum signal +G3-31-s to the CSA(1') 5 is set in the bit row G3 at the 31st bit position in the 64-bit numeral line; and so on.

Accordingly, the carry and sum data respectively set at the 30th and 31st positions of each bit row are vertically lined up. As seen from FIG. 8, bit rows G1 is not used in the population counting mode.

The bit values of the input sum and carry signals set in the G2 to G17 bit rows are added in the CSA(1') 5 and CPA(1') 6. The added result is set in the 26th to 31st bit position, which are hatched, in the 64-bit numeral line at the bottom of the chart in FIG. 8. The result represents the number of "1" bits in the 4-byte IU data set in the REG 2b in the sub-unit A. The result is sent to the REG 7a.

Since the input 8-byte data set in the REG 1b is equally divided into two elements, two sub-units are enough to perform the population counting. Therefore, in this embodiment, the sub-units A and B are used in the both modes, the population counting mode and the regular multiplication mode, and the other sub-units C and D are used only in the regular multiplication mode. Accordingly, the hardware and the function of the sub-unit B is same as those of the sub-unit A, and the hardware and the function of the sub-units C and D are different from that of the sub-units A and B.

The sub-units C and D have the same function and hardware, except the multiplicand and the multiplier in the sub-unit are different. The sub-unit C has the function of performing the regular multiplication by multiplying the CU data and the IU data in the regular multiplication mode and producing all bits "0" in the population counting mode. Therefore, the sub-unit C has the hardware such as a REG 2e having the same function as the REG 2a in the sub-unit A, no CSA(3') as the CSA(3') 12 in the sub-unit A and no SEL as the SEL 41 in the sub-unit A. As mentioned above, since the REG 2e has the same function as the REG 2a in the sub-unit A, from the REG 2e, the regular CU data are output in the regular multiplication mode and all "0" bit signals are output so that all "0" bit signals are output from a REG 7c to the CSA(2') in the population counting mode. The block diagram for the sub-unit C is depicted in FIG. 4. Since the block diagram for the sub-unit D is equal to that for the sub-unit C, the sub-unit D block diagram is omitted to be depicted in FIG. 4.

In the sub-unit B, the added result is set at the 26th to 31st bit position, which as illustrated in FIG. 8 are hatched, in the 64-bit numeral line at the bottom of the chart in the population counting mode. Wherein, the IL data is sent to an REG 2d in the sub-unit B from the REG 1b as seen from FIG. 4.

The two results output from sub-units A and B are added by the CSA(2') 8 as shown in FIG. 4. The output of the CSA(2') 8 is sent to the CPA(2') 9 and added therein. The results of the CPA (2') 9 is post-shifted by the post shifter 10 and set in the REG 11, thus storing the result data to the position for the upper 8 byte.

Figure 9:
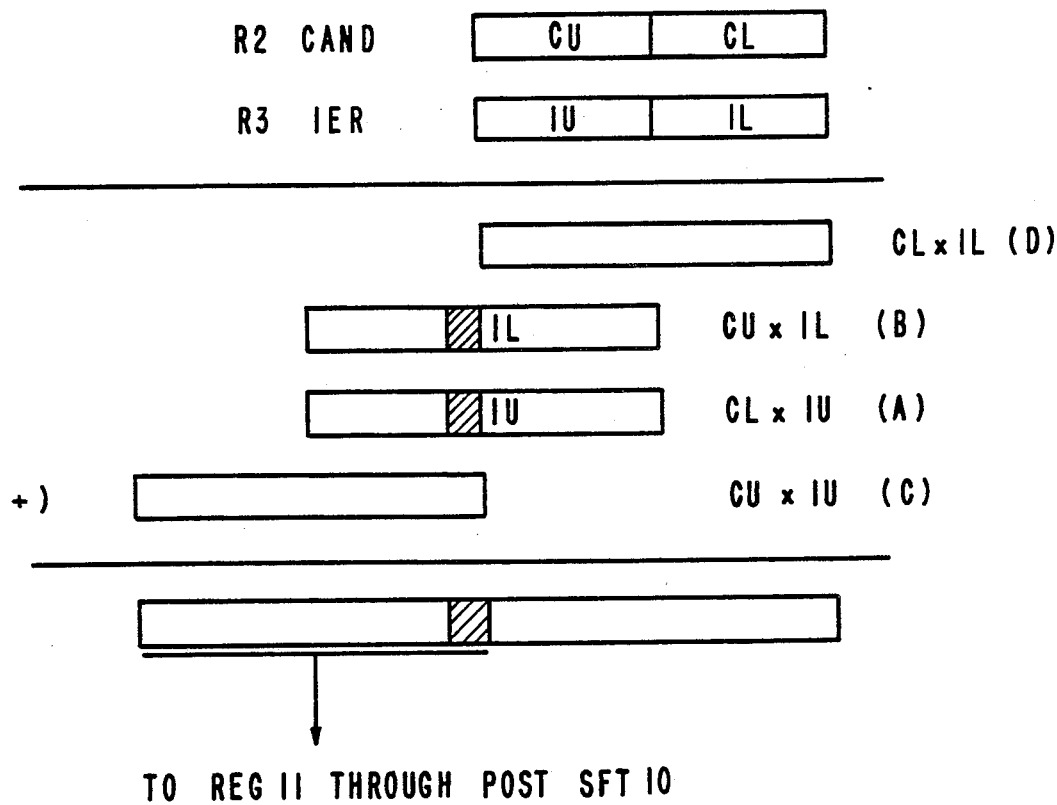
FIG. 9 is a schematic chart illustrating a method of addition of the number of "1" bits output from the four multiplying units in the first embodiment.

FIG. 9 illustrates the adding operation of the results of the four sub-units A, B, C and D, performed by the CSA(2') 8 and the CPA(2') 9. A symbol "R2 CAND" indicates the multiplicand consisted of the CU data and the CL data set to the REG(R2) 1a, and a symbol "R3 IER" indicates the multiplier consisted of the IU data and the IL data set in the REG(R3) 1b. In the regular multiplication mode, the addition of the partial products CL×IL, CU×IL, CL×IU and CU×IU are performed by the CSA(2') 8 and the CPA(2') 9 as shown in FIG. 9. Wherein, the partial products CL×IL, CU×IL, CL×IU and CU×IU are obtained from sub-units D, B, A and C respectively. However, in the population counting mode, the partial products are obtained only from the sub-units A and B and furthermore the "1" bit results of the IU data, obtained by the sub-unit A, and those of the IL data, obtained by the sub-unit B are both in the same bit position as depicted by the hatched portions in FIG. 9. Therefore, the result of the addition can be obtained by simply adding the hatched portion indicated by IL and IU, using the CSA(2') 8 and the CPA(2') 9 as in the regular multiplication mode. The data included in the upper 8-byte positions is sent to the REG 11 through the post SFT 10.

The execution of the population counting instruction is summarized as follows:

1) the input 8-byte data for population counting is set in the REG 1b from the VR 1.

2) the upper 4-byte data (IU data) of the input 8-byte data set in the REG 1b is set in the REG 2b of the sub-unit A, and the lower 4-byte data (IL data) of the input 8-byte data in the REG 1b is set in the REG 2d of the sub-unit B;

3) the divided 4 byte (32 bits) data (IU and IL data) are further divided into 16 pairs of two bits, and 16-bits of sum and carry signals are obtained by 16 half adders, suppressing the route from the REG 2b to the DCDR 3;

4) the output of the half adders is input to the CSA(1') 5 through the selector 41;

5) the number of "1" bits in the IU data is obtained by addition performed by CSA-(1') 5 and CPA-(1') 6 in the sub-unit A, 6) the number of "1" bits in the IL data is obtained by the same way as in the sub-unit A, in the sub-unit B at the same time;

7) the number of "1" in the IU data and in the IL data are set in the REG 7a in the sub-unit A and the REG 7b in the sub-unit B; respectively, and 8) the data in the REGs 7a and 7b is added by CSA(2') 8 and CPA(2') 9, taking the weight of respective bits into account.

Next, the second embodiment of the present invention will be explained.

Figure 10:
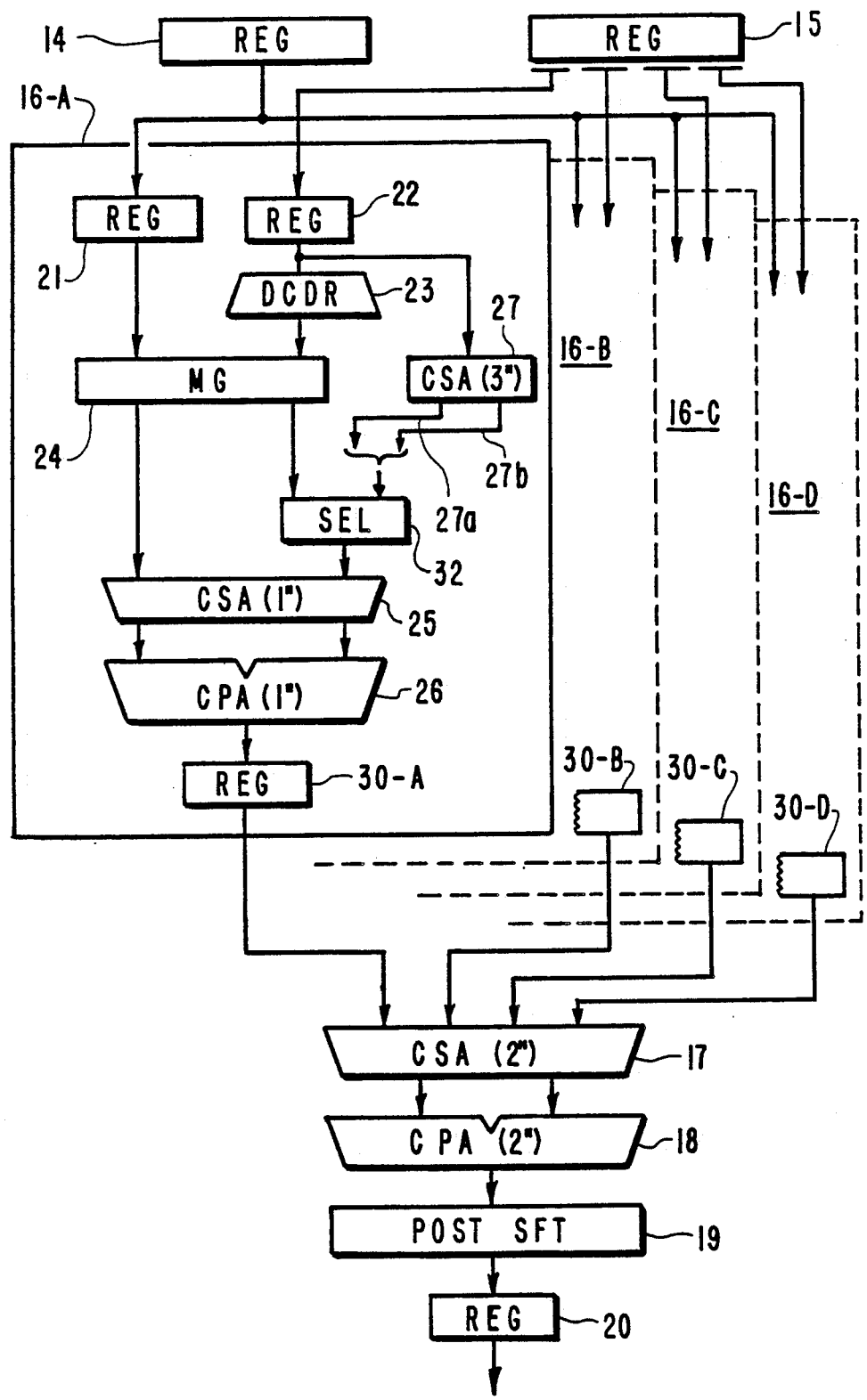
FIG. 10 is a block diagram of the second embodiment of the present invention.

FIG. 10 is a block diagram of the second multiplying unit illustrating the second embodiment of the present invention. The second type multiplying unit includes four multiplying sub-units 16-A, 16-B, 16-C and 16-D each having the same construction. The second embodiment operates differently from that of the first embodiment. In FIG. 10, the multiplicand and the multiplier are stored in REGs 14 and 15 respectively, and the output of the four sub-units are added by a CSA (2") 17 and a CPA (2") 18 and set to a REG 20 through a post SFT 19. Only the sub-unit 16-A will be explained because the sub-units 16-B, 16-C and 16-D are the same as the sub-unit 16-A in their construction and function.

In the second embodiment, the 8-byte multiplier is divided into four 2-byte elements which are sent to the sub-units 16-A, 16-B, 16-C and 16-D, respectively. The operation for multiplication and population counting in the sub-unit 16-A is essentially the same as in the sub-unit A of the first embodiment, except the data set to the REG 21 and to the REG 22 is 8 bytes and 2 bytes, respectively.

In the population counting mode, 8-byte multiplicand stored in the REG 14 is sent to a REG 21 in the sub-unit 16-A and the other three REGs having the same function as the REG 21 in sub-units 16-B, 16-C and 16-D, respectively. Meanwhile, the 8-byte input data for the population counting is stored in the REG 15 (instead of the 8-byte multiplier) and equally divided into four elements each consisting of 2-bytes of data for population counting. Each 2-byte data is sent to a REG 22 in the sub-unit 16-A and to the other three REGs, having the same function as REG 22, in the sub-units 16-B, 16-C and 16-D. The 2-byte data set in the REG 22 is sent to a third CSA (CSA(3")) 27. A half carry (HC) 27a and a half sum (HS) 27b output from the CSA(3") 27 are sent to a first CSA(CSA(1")) 25, having nine input terminals and four steps for addition, through a SEL 32. A sum and carry output from the CSA(1") 25 are added by a first CPA (CPA(1")) 26. The result of the addition from the CPA(1") is set in a REG 30-A.

The same operation as in the sub-unit 16-A is executed respectively in the sub-units 16-B, 16-C and 16-D simultaneously. The four results obtained by the sub-units 16-A, 16-B, 16-C and 16-D are added by a second CSA (CSA(2")) 17 and a second CPA (CPA(2")) 18 to obtain a total result of the 8-byte input data. The output from the CPA(2") 18 is set in a REG 20 through a post shifter 19.

Figure 11:
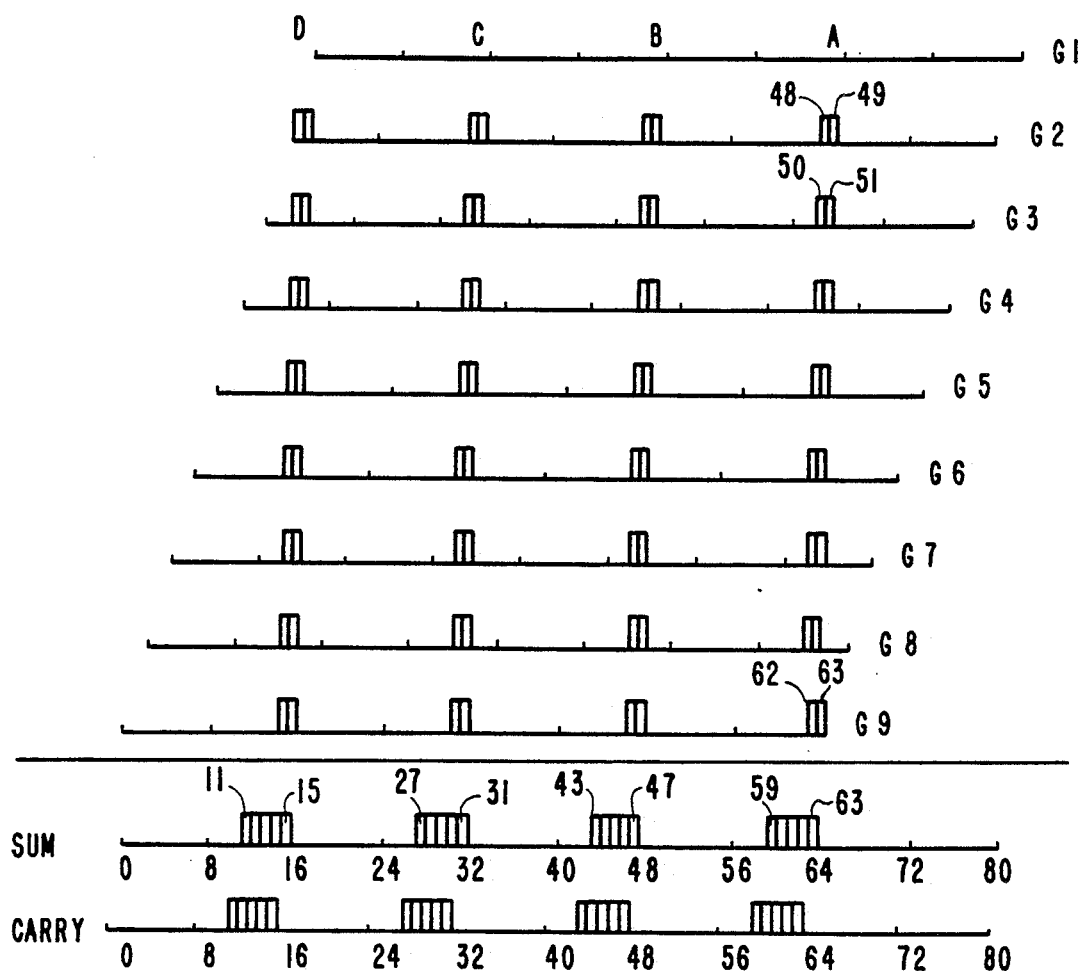
FIG. 11 is a schematic chart illustrating a method of addition in the sub-unit to obtain the full sum and full carry.

FIG. 11 is a schematic illustrating a way of addition in the CSA(1") 25 in the sub-unit 16-A to obtain the full sum and the full carry. In the sub-unit 16-A, the bit signal of carry through a first selector which is a part of the SEL 32 (not depicted in FIG. 10) and the bit signal of sum through a second selector which is an another part of the selector 32 are input to terminal G2 (which is not depicted) of the CSA(1") 25 and occupy the 48th and 49th bit positions of 64 bit numeral row, respectively. The similar bit signals input to terminal G3 of the CSA(1") 25 occupy the 50th and 51st bit positions, and so on. That input to terminal G9 of the CSA(1") 25 occupy the 62nd and the 63rd bit positions. In FIG. 11, the same addition in the sub-units 16-B, 16-C and 16-D are indicated together.

The results of addition of the carry and sum by the CSA(1") 25 are in the bit positions from 59th to 63rd, as shown at the bottom of the chart. In the same way, the bit positions of the data of the carry and sum in the sub-units 16-B, 16-C and 16-D are from 43rd to 47th, from 27th to 31st and from 11th to 15th respectively, as shown at the bottom of the chart in FIG. 11. The full sum and full carry obtained in the CSA(1") 25 shown at the bottom, are added by the CPA(1") 26 to obtain the number of "1" bits present in the first quarter part of the multiplier. Then, the data is set in the REG 30-A.

Figure 12:
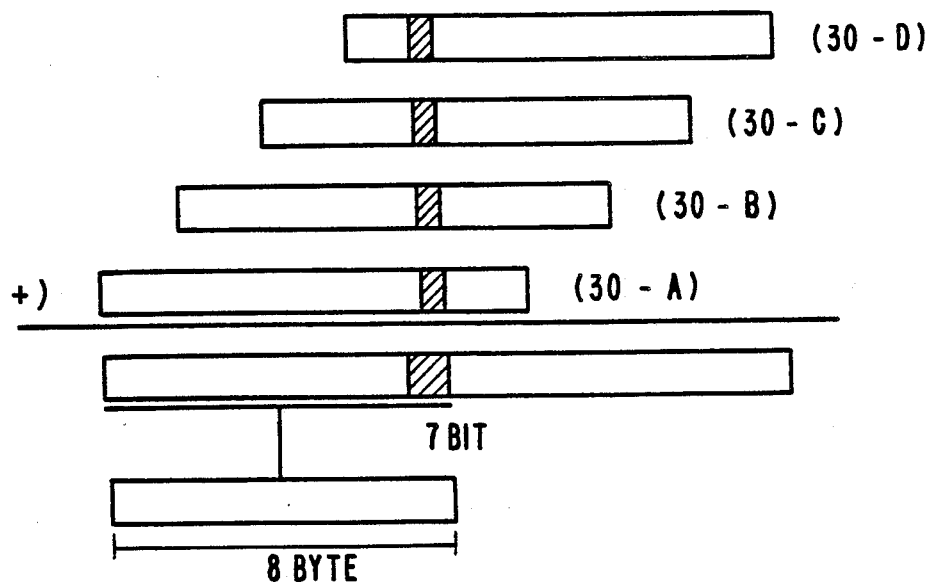
FIG. 12 is a schematic chart illustrating a method of addition of the number of "1" bits output from the four multiplying units in the second embodiment.

FIG. 12 is a schematic illustrating a way of addition in the CSA(2") 17 and CPA(2") 18 in order to obtain the total number of "1" bits present in the multiplier. The data from each of the four REGs 30-A, 30-B, 30-C and 30-D is added as an addition of partial products. The data from the REGs 30-A, 30-B, 30-C and 30-D has a width of 10 bytes. The number of "1" bits present in a quarter of the multiplier the REG 15 is set in a group of hatched bits as shown in FIG. 11. Each of the four groups of hatched bits are vertically lined up in parallel four rows shifted by 2 bytes as shown in FIG. 12. As a result, the resultant data has a width of 16 bytes. Discarding the lower 8 bytes, the upper half of the 16 byte provides 8-bytes of resultant data, in which the total number of "1" bits present in the multiplier is set in the last seven bits.

What is claimed is:

1. A multiplying unit provided in a computer system, to perform multiplication of multiplicand data and multiplier data in a multiplication mode and to perform population counting of population counting input data in a population counting mode, said multiplying unit comprising:

means for dividing the multiplicand data into a plurality of multiplicand elements having a first size in the multiplicand mode;

dividing means for dividing the multiplier data into a plurality of multiplier elements having a second size in the multiplication mode, and for dividing the population counting input data into a plurality of population counting elements of the second size in the population counting mode;

a plurality of multiplying sub-units for executing simultaneously partial multiplication among the multiplicand elements and the multiplier elements when in the multiplication mode to produce partial product data, and for executing simultaneously partial population countings for the population counting elements when in the population counting mode to produce partial counted data; and means for adding the partial product data from said multiplying sub-units and outputting a multiplication result of the multiplicand data and the multiplier data when in the multiplication mode, and for adding the partial counted data from said multiplying sub-units and outputting a population counting result of the population counting input data when in the population counting mode.

2. A multiplying unit according to claim 1, wherein at least one of said plurality of multiplying sub-units is a first type multiplying sub-unit, each said first type multiplying sub-unit comprising:

a first sub-unit register, having bit positions, for storing one of the multiplier elements in the multiplication mode, and for storing one of the population counting elements as a corresponding population counting element in the population counting mode;

a second carry save adder, operatively connected to said first sub-unit register, for counting the number of "1" bits in the corresponding population counting element stored in said first sub-unit register by simultaneously inputting every pair of bits in the corresponding population counting element, each pair of bits stored in two adjacent bit positions in said first sub-unit register, and for outputting an elemental sum and elemental carry data for each pair of bits of the corresponding population counting element;

a second sub-unit register for storing and outputting one of the multiplicand elements in the multiplication mode, and for generating and outputting all "0" bits in the population counting mode;

a decoder, operatively connected to said first sub-unit register, for outputting decoded signals required for multiplying the multiplicand element and the multiplier element upon inputting the multiplier element from said first sub-unit register in the multiplication mode, and for generating and outputting all "0" bits in the population counting mode;

a multiple generator, operatively connected to said second sub-unit register and said decoder, for generating and outputting shifted data by combining the multiplicand element from said second sub-unit register and the decoded signals from said decoder in the multiplication mode, and for generating and outputting all "0" bits in the population counting mode;

summing means, having a first carry save adder and a first carry propagate adder, for outputting the partial product data of the partial multiplication of the multiplicand element and the multiplier element upon adding the shifted data from said multiple generator in the multiplication mode, and for outputting the partial counted data of the number of "1" bits in the population counting element upon adding the elemental sum and elemental carry data from said second carry save adder in the population counting mode; and selector means for selecting one of the shifted data from said multiple generator and the elemental sum and elemental carry data from said second carry save adder to send to said summing means in accordance with the multiplication mode and the population counting mode, respectively.

3. A multiplying unit according to claim 2, wherein at least one of said plurality of multiplying sub-units is a second type multiplying sub-unit, each said second type multiplying sub-unit comprising:

a third sub-unit register for storing and outputting one of the multiplier elements in the multiplication mode;

a fourth sub-unit register for setting and outputting one of the multiplicand elements in the multiplication mode, and for generating and outputting all "0" bits in the population counting mode; and a decoder, operatively connected to said third sub-unit register, for outputting decoded signals required for multiplying the multiplicand element and the multiplier element upon inputting the multiplier element from said third sub-unit register in the multiplication mode, and for generating and outputting all "0" bits in the population counting mode.

4. A multiplying unit according to claim 2, wherein said dividing means divides the multiplier data into a first quantity of multiplier elements when in the multiplication mode, and divides the population counting input data into the first quantity of population counting elements when in the population counting mode, and wherein the number of said first type multiplying sub-units equals the first quantity.

5. A multiplying unit according to claim 1, wherein said dividing means divides the multiplier data into a first quantity of multiplier elements when in the multiplication mode, and divides the population counting input data into the first quantity of population counting elements when in the population counting mode.

6. A multiplying unit provided in a computer system, to perform multiplication of multiplicand data and multiplier data in a multiplication mode and to perform population counting of population counting input data in a population counting mode, said multiplying unit comprising:

means for storing the multiplicand data in the multiplication mode;

dividing means for dividing the multiplier data into a plurality of multiplier elements having an element size in the multiplication mode, and dividing the population counting input data into a plurality of population counting elements of the element size when in the population counting mode;

a plurality of multiplying sub-units for executing simultaneously partial multiplication among the multiplicand data and the multiplier elements when in the multiplication mode to produce partial product data, and for executing simultaneously partial population countings for the population counting elements when in the population counting mode to produce partial counted data; and means for adding the partial product data from said multiplying sub-units and outputting a multiplication result of the multiplicand data and the multiplier data when in the multiplication mode, and for adding the partial counted data from said multiplying sub-units and outputting a population counting result of the population counting input data when in the population counting mode.

7. A multiplying unit according to claim 6, wherein at least one of said plurality of multiplying sub-units is a first type multiplying sub-unit, each said first type multiplying sub-unit comprising:

a first sub-unit register, having bit positions, for storing one of the multiplier elements in the multiplication mode, and for storing one of the population counting elements as a corresponding population counting element in the population counting mode;

a second carry save adder, operatively connected to said first sub-unit register, for counting the number of "1" bits in the corresponding population counting element stored in said first sub-unit register by simultaneously inputting every pair of bits in the corresponding population counting element, each pair of bits stored in two adjacent bit positions in said first sub-unit register, and for outputting an elemental sum and elemental carry data for each pair of bits of the corresponding population counting element;

a second sub-unit register for storing and outputting the multiplicand data in the multiplicand mode, and for generating and outputting all "0" bits in the population counting mode;

a decoder, operatively connected to said first sub-unit register, for outputting decoded signals required for multiplying the multiplicand data and the multiplier element upon inputting the multiplier element from said first sub-unit register in the multiplication mode, and for generating and outputting all "0" bits in the population counting mode;

a multiple generator, operatively connected to said second sub-unit register and said decoder, for generating and outputting shifted data by combining the multiplicand data from said second sub-unit register and the decoded signals from said decoder in the multiplication mode, and for generating and outputting all "0" bits in the population counting mode;

summing means, having a first carry save adder and a first carry propagate adder, for outputting the partial product data of the partial multiplication of the multiplicand data and the multiplier element upon adding the shifted data from said multiple generator in the multiplication mode, and for outputting the partial counted data of the number of "1" bits in the population counting element upon adding the elemental sum and elemental carry data from said second carry save adder in the population counting mode; and selector means for selecting one of the shifted data from said multiple generator and the elemental sum and elemental carry data from said second carry save adder to send to said summing means in accordance with the multiplication mode and the population counting mode, respectively.

8. A multiplying unit according to claim 7, wherein at least one of said plurality of multiplying sub-units is a second type multiplying sub-unit, each said second type multiplying sub-unit comprising:

a third sub-unit register for storing and outputting one of the multiplier elements in the multiplication mode;

a fourth sub-unit register for storing and outputting the multiplicand data in the multiplication mode, and for generating and outputting all "0" bits in the population counting mode; and a decoder, operatively connected to said third sub-unit register, for outputting decoded signals required for multiplying the multiplicand data and the multiplier element upon inputting the multiplier element from said third sub-unit register in the multiplication mode, and for generating and outputting all "0" bits in the population counting mode.

9. A multiplying unit according to claim 7,
wherein said dividing means divides the multiplier data into a first quantity of multiplier elements when in the multiplication mode, and divides the population counting input data into the first quantity of population counting elements when in the population counting mode, and
wherein the number of said first type multiplying sub-units equals the first quantity.

10. A multiplying unit according to claim 9, wherein all of said plurality of multiplying sub-units are of the first type multiplying sub-unit.

11. A multiplying unit according to claim 6, wherein said dividing means divides the multiplier data into a first quantity of multiplier elements when in the multiplication mode, and divides the population counting input data into the first quantity of population counting elements when in the population counting mode.

* * * * *

UNITED STATES PATENT AND TRADEMARK OFFICE
CERTIFICATE OF CORRECTION

PATENT NO. : 4,989,168
DATED : January 29, 1991
INVENTOR(S) : Kuroda et al.

It is certified that error appears in the above-identified patent and that said Letters Patent is hereby corrected as shown below:

Col. 6, line 16, delete "in".
Col. 10, line 13, before "in" insert --bits--.
Col. 11, line 34, after "multiplier" insert --stored in--.

Signed and Sealed this

Twenty-eighth Day of July, 1992

*Attest:*

DOUGLAS B. COMER

*Attesting Officer*   Acting Commissioner of Patents and Trademarks